(12) United States Patent
Wolf

(10) Patent No.: US 11,011,069 B1
(45) Date of Patent: May 18, 2021

(54) METHOD AND SYSTEM FOR ALTERING LEVEL OF DIFFICULTY OF COMPUTER GAMES AND LEARNING PROGRAMS

(71) Applicant: Randy Wolf, Flat Rock, AL (US)

(72) Inventor: Randy Wolf, Flat Rock, AL (US)

( * ) Notice: Subject to any disclaimer, the term of this patent is extended or adjusted under 35 U.S.C. 154(b) by 0 days.

(21) Appl. No.: 16/669,610

(22) Filed: Oct. 31, 2019

(51) Int. Cl.
| | | |
|---|---|---|
| G09B 7/02 | (2006.01) | |
| A63F 9/18 | (2006.01) | |
| G09B 5/06 | (2006.01) | |
| A63F 3/04 | (2006.01) | |
| G09B 7/10 | (2006.01) | |
| G09B 7/07 | (2006.01) | |
| G09B 7/08 | (2006.01) | |

(52) U.S. Cl.
CPC ............... *G09B 7/02* (2013.01); *A63F 3/04* (2013.01); *A63F 9/18* (2013.01); *G09B 5/065* (2013.01); *G09B 7/07* (2013.01); *G09B 7/08* (2013.01); *G09B 7/10* (2013.01)

(58) Field of Classification Search
CPC .. A63F 3/04; A63F 9/18; G09B 5/065; G09B 7/02; G09B 7/07; G09B 7/08; G09B 7/10
See application file for complete search history.

(56) References Cited

U.S. PATENT DOCUMENTS

| | | | |
|---|---|---|---|
| 5,270,800 A | 12/1993 | Sweet | |
| 6,398,556 B1 | 6/2002 | Ho et al. | |
| 7,929,805 B2 | 4/2011 | Wang et al. | |
| 8,540,520 B2 | 9/2013 | Dohrmann | |
| 9,141,827 B2 | 9/2015 | Ho et al. | |
| 9,498,704 B1 | 11/2016 | Cohen et al. | |
| 9,849,388 B2 | 12/2017 | Cohen et al. | |
| 10,043,410 B1* | 8/2018 | Swank | G09B 5/065 |
| 10,150,036 B2 | 12/2018 | Evald et al. | |
| 10,322,349 B2 | 6/2019 | Cohen et al. | |
| 10,332,412 B2 | 6/2019 | Swank et al. | |
| 10,363,487 B2 | 7/2019 | Lai et al. | |
| 2004/0224775 A1* | 11/2004 | Wood | A63F 13/95 |
| | | | 463/43 |
| 2012/0052476 A1* | 3/2012 | Graesser | G09B 7/04 |
| | | | 434/362 |
| 2014/0272905 A1* | 9/2014 | Boersma | G09B 7/08 |
| | | | 434/362 |
| 2014/0278895 A1* | 9/2014 | Grimes | G06Q 30/0231 |
| | | | 705/14.31 |

\* cited by examiner

*Primary Examiner* — Jason T Yen
(74) *Attorney, Agent, or Firm* — Lanier Ford Shaver & Payne, PC; Gerald M. Walsh

(57) ABSTRACT

A computer implemented method for helping a user of computer game and learning programs to perceive a correct answer to a question presented by the programs. These computer game and learning programs (Set A programs) are modified by a computer program of this invention that accepts exactly one token string to be a correct answer (Set ESP program). Answer related output information in a Set A program is modified by the Set ESP program to provide a cue (hint) to a user to increase or decrease the ability of a user to perceive a correct answer. When a user enters an answer a guard requirement in the Set ESP program is satisfied and a guarded subfunction in the Set ESP program is executed if the user's answer is correct. Cues for answers can be visual (with or without eye-tracking), audible, and haptic and can be presented subliminally.

16 Claims, 7 Drawing Sheets

METHOD AND SYSTEM FOR ALTERING LEVEL OF DIFFICULTY OF COMPUTER GAMES AND LEARNING PROGRAMS

FIELD OF THE INVENTION

This invention relates to systems and methods for managing computer games and learning programs and, more particularly, to a system and method for altering the level of difficulty in these programs for obtaining correct answers and solutions.

BACKGROUND OF THE INVENTION

Computer implemented games are a well-known category of games that allow a player to interact with a computing device to cause the processor to perform certain functions and typically display a result on a screen or other display device. Different types of games have evolved from classical arcade games into games that can be played on a handheld device such as a smartphone, tablet or personal computer. Some games are also connected to the Internet and the player can play against or compare scores with other users in multiplayer mode.

There are multiple challenges for the designer of computer-implemented games. One challenge is making a game fun and compelling without the game being excessively difficult for scoring and winning. Another challenge is designing gameplay to be engaging and rewarding to players. Computer games need to be easily understood at their simplest or introductory levels, providing rewarding gameplay with quite simple game mechanics. However, the computer games need to become progressively more challenging so that players are not bored but remain engaged and develop rewarding skills. Effective engagement requires various forms of feedback to reinforce a player's sense of success and accomplishment.

These challenges also apply to computer learning programs. The same capabilities of the computer which make it an excellent game platform, also make it an excellent teaching tool. The ability to quickly store and manipulate large quantities of information, and to provide different output based on an analysis of that information, gives the computer great potential in the educational field. Nonetheless, previous attempts at using computers for educational purposes have generally involved teaching programs which, despite being well-designed educationally, are quite dry and scholarly. They are simply not considered to be "fun" like a computer game.

Both at home and in schools, the computer is gradually becoming a major medium for education. One weakness of a computer-aided-educational system is that it typically ignores a student's concentration level. Prior art systems have sought to provide educational programs on desktop computers. For example, U.S. Pat. No. 5,035,625 discloses a method of teaching a student using a computer game teaching system. A plurality of questions contained in a tutorial module are presented to the student at pause points in the game and a scoring algorithm for the game is modified as a result of positive responses to the questions to permit higher probability of scoring in the game. U.S. Pat. No. 5,980,264, teaches a screen saver that displays questions and receives answers, testing a user's knowledge on certain topics. U.S. Pat. No. 6,139,330, teaches a system and method that test a user on different subjects. The system decouples a device used for entertainment, recoupling it only when the user performs some specified task, such as attempting to answer a question.

A more important motivator than fun or entertainment in a game or learning environment is achieving success, for example, by getting a correct answer, solving a puzzle, or getting a winning score in a game. Helping a user in a game or in a learning computer program by decreasing the difficulty of the question, game, puzzle, etc. to achieve success is not effective. The user is aware that the task is easier. Satisfaction and a sense of fulfillment come from successfully completing a difficult task. Inducing a user to know a correct answer or solution should help the user remember the answer or solution. What is needed is a computer implemented method and system that will help a user of a computer game or learning program figure out difficult answers and solve difficult problems without feeling that he or she has been helped.

SUMMARY OF THE INVENTION

This invention is a computer implemented method for helping or hindering a user of a computer game program or computer learning program to perceive a correct answer to a question presented to the user from the computer game program or computer learning program. A computer game program or computer learning program is provided that accepts an input of any of a set of strings to be a correct answer (referred to as a Set A program). The Set A program asks the user a question and provides output information that helps the user to obtain a correct answer to the question. A computer program that accepts exactly one string to be a correct answer (referred to as a Set ESP program) is provided. The output information in the Set A program is modified by the Set ESP program and/or a cue is provided by the Set Esp program to increase or decrease the ability of a user to perceive a correct answer to the question. An answer to the question is provided by the user entering an answer input into the Set ESP program through a computer input device. A guard requirement in the Set ESP program is satisfied for the user's answer input. A guarded subfunction in the Set ESP program is executed if the user's answer input is correct. The Set ESP program responds to the user's answer input, through a computer output device, as to whether the user's answer input is correct or incorrect.

In order to help a user, a cue (hint) in the Set ESP program is selected wherein the cue decreases the difficulty of the user to perceive a correct answer to the question. The cue is an audible cue and/or a visual cue. The audible cue is played on an audio device and the visual cue is displayed on a display device. The cue may be a subliminal cue or a supraliminal cue. Eye-tracking the user may be used to display the visual cue at a location on the display device at which location the user is not looking. A moving banner may be used on the display device, for example at the bottom of the display device, for this purpose. The cue may consist of the output information which is modified to be more informative about the correct answer.

In order to hinder a user, a desired output information in the Set A program may be selected and modified with the Set ESP program to increase the difficulty of the user to perceive a correct answer to the question. A cue corresponding to the desired modified output information is then provided to increase the difficulty of the user to perceive the correct answer, with the cue being an audible or a visual cue. The audible cue is played on an audio device and the visual cue is displayed on a display device. The selected desired output information can be removed and replaced with output information not useful in choosing a correct answer. The modified desired output information may be presented supraliminally and contain less information or be displayed more briefly. The modified desired output information may be presented subliminally as a cue. A space may be created in the display device by rasterizing and graphically scaling enough of the modified desired output information to make sufficient space and displaying the cue visually. The modified desired output is scaled down and displayed as a moving image in a banner display, wherein eye-tracking is used to display the visual cue. Alternatively, during any video frame where the cues are not being displayed, replace the desired output information with a video filler that contains no useful information regarding the correct answer, and use eye-tracking to display the visual cue with or without a high-frame video display.

During the development of computer game programs or computer learning programs it is often necessary to modify these programs, so they are either easier to use or harder to use. A computer game can have a difficulty level which the user can use to make the game easier or harder. Methodically creating Set ESP programs provides a way to systematically create less or more difficult programs which provides two benefits. The first benefit is the existence of a simple, easy, and effable technique for creating such programs. The second is the derived value of decreased cost of development for such less or more difficult programs. A game developer typically produces a prototype of a game first. Later, the game developer typically needs to provide both easier and harder versions of the game. This invention can be implemented through application programming interface architectures known in the art.

DETAILED DESCRIPTION OF THE INVENTION

While the following description details the preferred embodiments of the present invention, it is to be understood that the invention is not limited in its application to the details of arrangement of the parts or steps of the methods illustrated in the accompanying figures, since the invention is capable of other embodiments and of being practiced in various ways.

Figure 1:
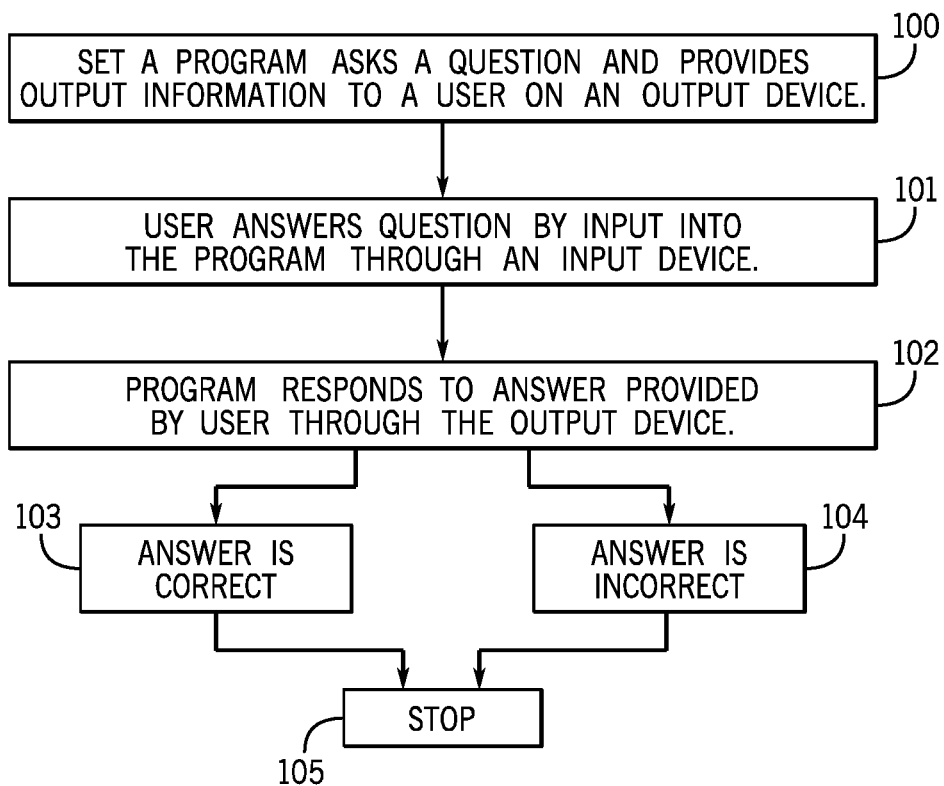
FIG. 1 is a flow chart depicting a program sequence of computer game programs and computer learning programs known in the art.

Computer game programs and computer learning programs use a program sequence as depicted in the Flow Chart of FIG. 1. In this disclosure, this type of computer program is referred to as Set A. In the Set A program, the program provides a user with a question, which can be any kind of request for a specific kind of answer, such as asking for: a word in a crossword puzzle, a combination to a lock, a direction in a maze, a location on a map, an answer to a math question, an answer to a history question, a reading comprehension question, and so on. The Set A program also provides information with the question (Step 100). This output of information helps the user, to some specific degree, to obtain an answer to a question. The user answers the question by input of the answer into the program through an input device (Step 101).

The Set A type of program has a set of answers to the question and the Set A program requires the user to input a correct answer in order to achieve a correct score. In this regard, computer games and computer learning programs attempt to simultaneously satisfy two contradictory goals. For example, an educational program typically asks a user to select the correct answer to a question while simultaneously not displaying the correct answer, although the correct answer is available in the program. This lack of giving the correct answer acts to confound the overt goal of the program which is to get the user to enter the correct answer. A gaming program typically allows the player to win by entering some specific input sequence while simultaneously acting to prevent the user from taking that action by not revealing the winning input sequence. After the user provides input of the answer into the computer program, the program responds through an output device (Step 102) whether the answer is correct (Step 103) or incorrect (Step 104). The process then stops (Step 105).

Figure 2:
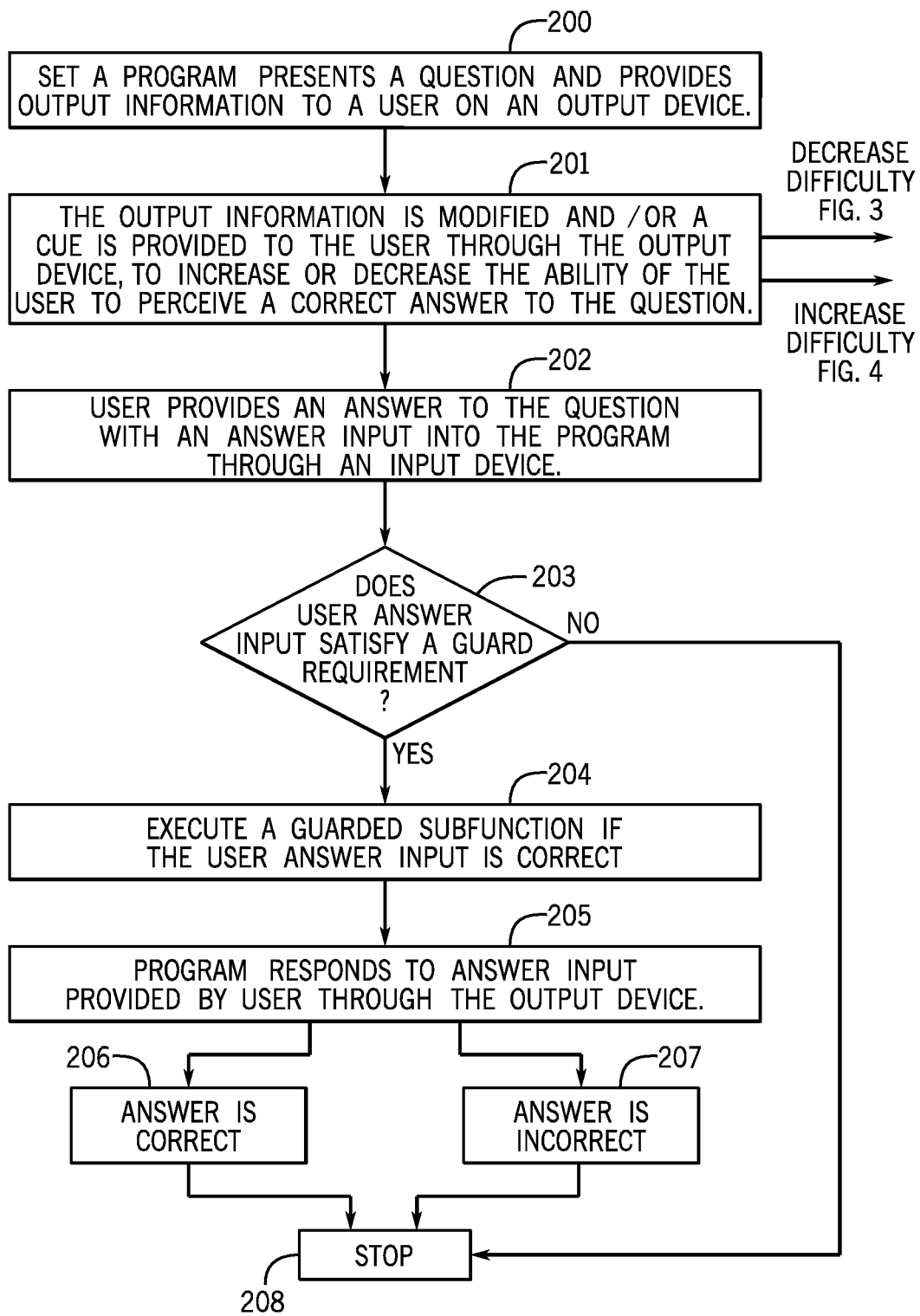
FIG. 2 is a flow chart showing a program sequence of the computer implemented program of the present invention for modifying the level of difficulty of computer game programs and computer learning programs.

The present invention provides a programming method to convert a Set A computer program into a computer program that increases or decreases the difficulty for a user to answer a question in the Set A computer program. A question is any kind of request made by the computer program to the user that requires the user to enter input into the computer program in response to the request. An answer to a question is any input entered into the computer program by the user in response to the question. This programming method of the present invention is shown generally in FIG. 2 and is referred to as Extra Software Perception (ESP) because it helps a user perceive a correct answer to a question in a Set A program. The Extra Software Perception program is referred to as Set ESP. The Set A program asks a question and provides output information to a user on an output device (Step 200). The output information is modified and/or a cue is provided to the user through the output device to increase or decrease the difficulty of answering the question (Step 201).

To create a less difficult, easier version of the Set A program, the Set ESP program may provide more output information about the next, correct expected input sequence for a correct answer. The output information can be modified to be more informative about a correct answer. To create a more difficult version of the Set A program, the Set ESP program may change the display method of some, or all of the helpful information provided by the Set A program to another method of display or output, wherein the informative output is less helpful. The decrease in difficulty is explained in more detail in FIG. 3 and the increase in difficulty is explained in more detail in FIG. 4. The user provides an answer to the question with an exact input through an input device (Step 202). A Set ESP program considers exactly one string to be correct answer, whereas the Set A program considers any of a set of strings to be a correct answer.

The set ESP program queries whether the user answer input satisfies a guard requirement (Step 203). If so, the Set ESP program performs a guarded subfunction (Step 204). The guarded subfunction acts as a "software lock" which functions in software analogously to a mechanical lock. Only if the user input is correct is the guarded subfunction executed. At the point in execution before the user enters the input, the process is simultaneously attempting to achieve two conflicting goals. It is taking every action and inaction necessary and sufficient to allow the execution of the guarded subfunction and it is taking every action and inaction necessary and sufficient to refuse execution of the guarded subfunction. It is doing both simultaneously. The first of these two conflicting actions is to elicit from the user the correct input sequence hence acting to aid access to the guarded subfunction. The second conflicting action is to elicit from the user an incorrect input sequence hence acting to impede access to the guarded subfunction. Only when the actual input is entered is the conflict resolved. In the mechanical lock analogy, the point in time before a key is inserted into the lock and rotated the mechanical lock functions both to prevent access or to permit access, although these two functions are diametrically opposed. Only when the right key is used is access permitted. The Set ESP program responds to the answer input provided by the user (205) and displays the answer is correct (206) or incorrect (207). The sequence then stops (208).

Figure 3:
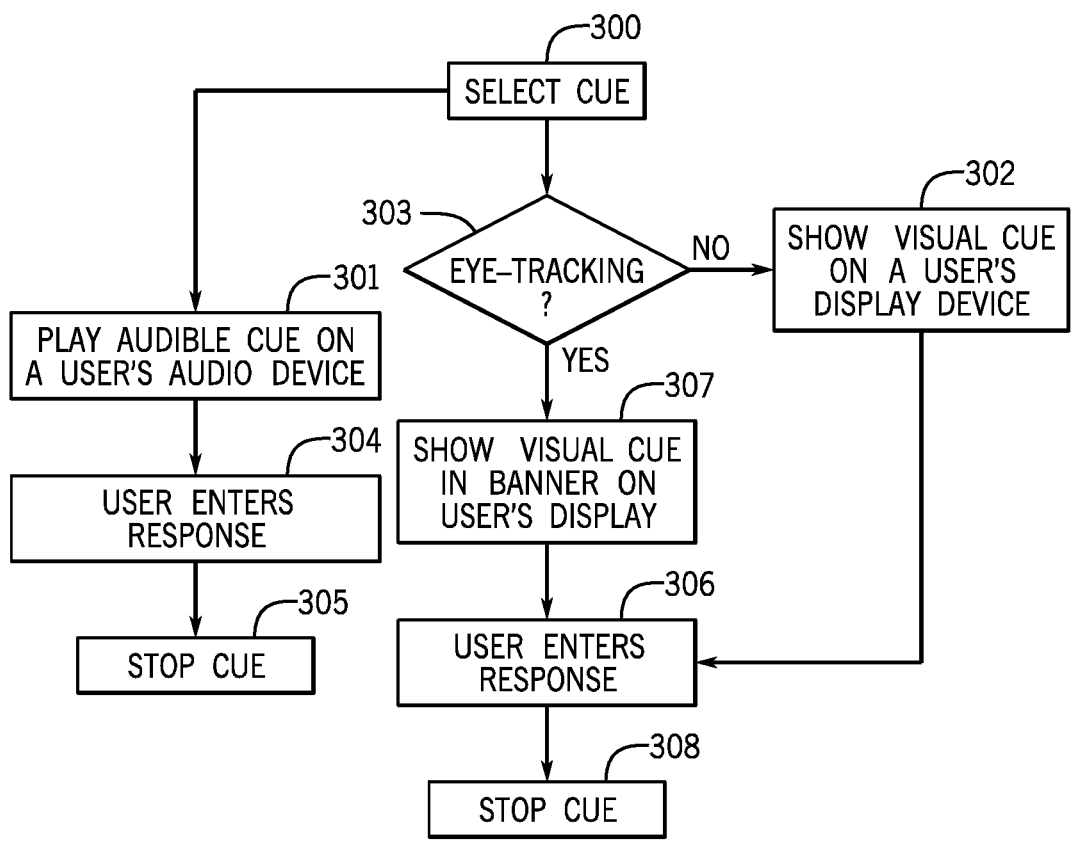
FIG. 3 is a flow chart showing a program sequence for displaying subliminal cues to decrease the difficulty of answering questions in computer game programs and computer learning programs.

FIG. 3 shows a flowchart for displaying subliminal cues to decrease the difficulty of answering a question in a Set A program to help a user. A desired subliminal cue is selected (Step 300) which can be an audible cue (Step 301) or a visual cue (Step 302 or Step 307). Eye-tracking (Step 303) can be used to display the visual cue. Subliminal perception is the reception of stimuli, such as auditory or visual stimuli, that are presented for such a short time as to be barely noticed. Such stimuli can influence behavior. It is known that consciousness and information transmission may involve different physiologic mechanisms and that unconscious cerebration may occur (Radu, IM, Subliminal perception of complex visual stimuli; Romanian Journal of Ophthalmology, Vol. 60, Issue 4, pages 226-230, 2016).

The present invention uses both supraliminal (consciously detectable) and subliminal stimulation (unconsciously detectable) to provide cues or hints related to a correct answer to a question. Supraliminal and subliminal haptic stimulation, such as vibration, can also be used to provide cues. Radu teaches methods how to measure the threshold and range of duration of visual subliminal stimuli. The same methods can be used for audible and haptic stimuli. Radu teaches that 17 ms to 50 ms duration of the cue is effective for subliminal visual stimuli.

If an audible cue (301) is presented to a user, the user decides on an answer and enters the response (Step 304). The audible cue (Step 301) preferably, will run repeatedly until the response is entered (Step 304) and the audible cueing stops (Step 305). If a visual cue (Step 302) is presented to a user, the user decides on an answer and enters the response (Step 306). The visual cue (Step 306 or Step 307) will, preferably, run repeatedly until the response is entered and the visual cueing stops (Step 306).

Eye-tracking (Step 303) detects at what part of a display a user is looking. An eye-tracker senses the position of a user's eyes and the eye position measurement can be used to display a visual cue only where the user's eyes are not focused. The Set ESP program uses input from the eye-tracker to flash a subliminal visual cue at a screen display location at which the user is not looking. By using eye-tracking, it is possible to use low-frame rate (inexpensive) presently available video displays to be used for subliminal visual cueing. Preferably, subliminal visual cueing is placed in a moving banner steganographically at some random, un-used, available location on the video display sufficiently far from the user's present point of focus (Step 307). A Tobii-eye tracker may be used for eye-tracking with the Set ESP program (www.tobii.com). After presentation of the subliminal visual cueing (Step 307), the user enters a response (Step 306) and the cueing is stopped (Step 308).

Audible, visual and haptic cues can be presented individually or simultaneously and can be either supraliminal or subliminal and may involve some degree of semantic indirection, for example using a symbol for a word. Other audio transforms can be used in addition to reduced volume.

A moving banner display is a preferred method of displaying subliminal visual cues on a visual display. Preferably, the banner is never empty so as to avoid distracting flashes of rapid intensity changes to which peripheral vision is sensitive. The cue is displayed periodically in the banner until the user finalizes his or her input answer entry. Based on the user's visual perspicacity for subliminal cues, the cues are displayed for an optimum number of video frames. When the user looks to directly look at the cue(s) in the banner, the cue in the banner is replaced with filler video.

If the display device has a low-frame rate, visual cues are displayed in available space on the display as far as possible from the expected normal point of focus of the user for the best number of frames per second. The best number of frames is the closest match possible with the expected user's visual perspicacity for subliminal cues. The closest match is based either on testing of the user or upon the predicted normative value for humans in general and with the achievable frame rate for the display. If the display device has a low frame rate, then the best results may be achieved by displaying the cue only for a limited number of frames per time period and by randomly changing the cue display location. The user will then not anticipate beforehand where the cue will be displayed. If the display device has a high-frame rate, then either the same technique used for low-frame rate devices can be used or the whole or part of the screen area may be used for subliminal presentation. Steganographic masking may be used in the cue presentation.

Figure 4:
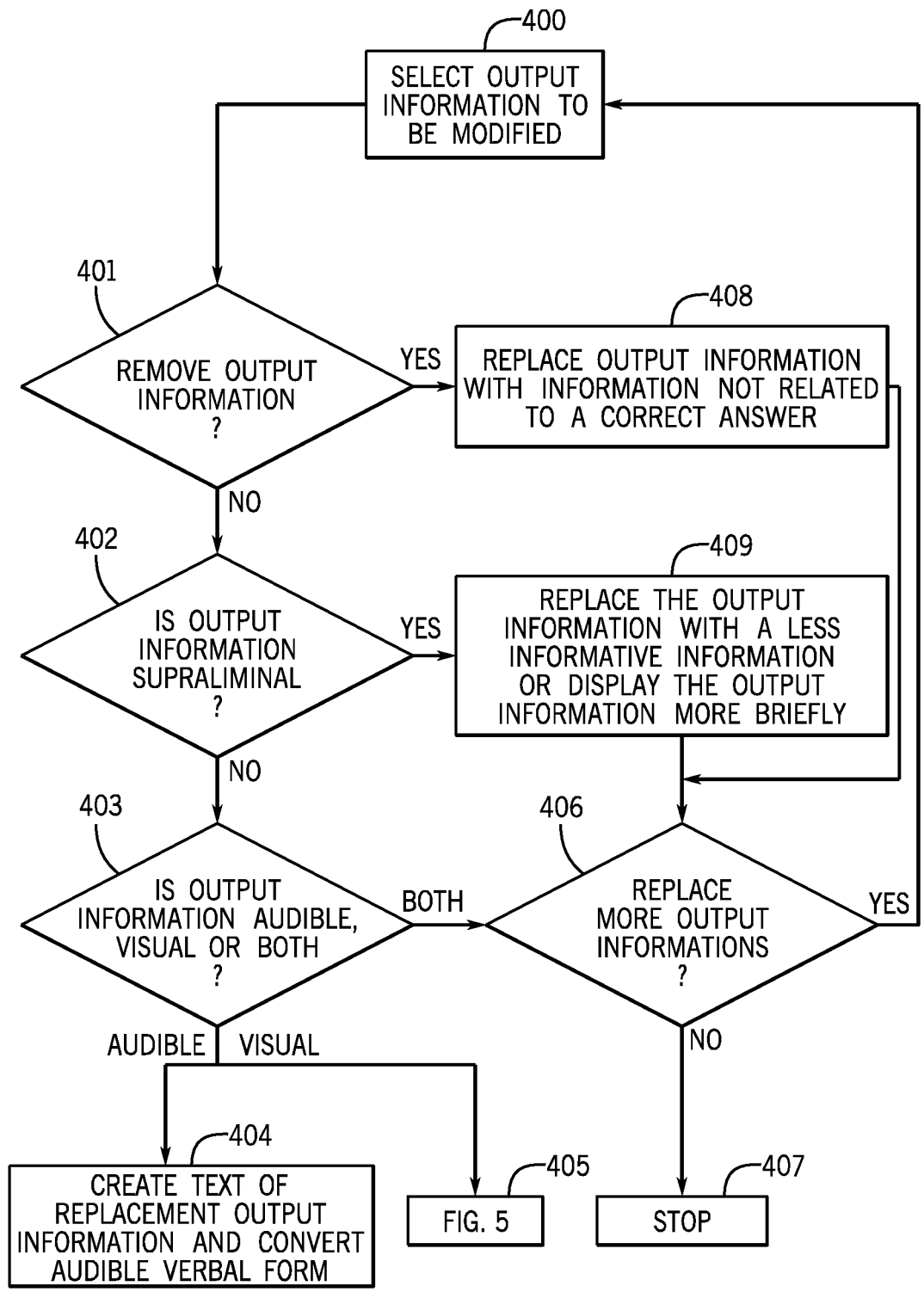
FIG. 4 is a flow chart showing a program sequence for altering output information to increase the difficulty in answering questions provided by computer game programs or a computer learning programs.

FIG. 4 shows a flow chart for altering output information to increase the difficulty in answering a question provided by a computer game program or a computer learning program to hinder a user. When a computer game program or computer learning program provides a question (problem) the program usually provides some information (output information) to guide a user regarding the question and/or how to answer the question. The Set ESP program of this invention can alter this output information to make answering the question more difficult.

Figure 5:
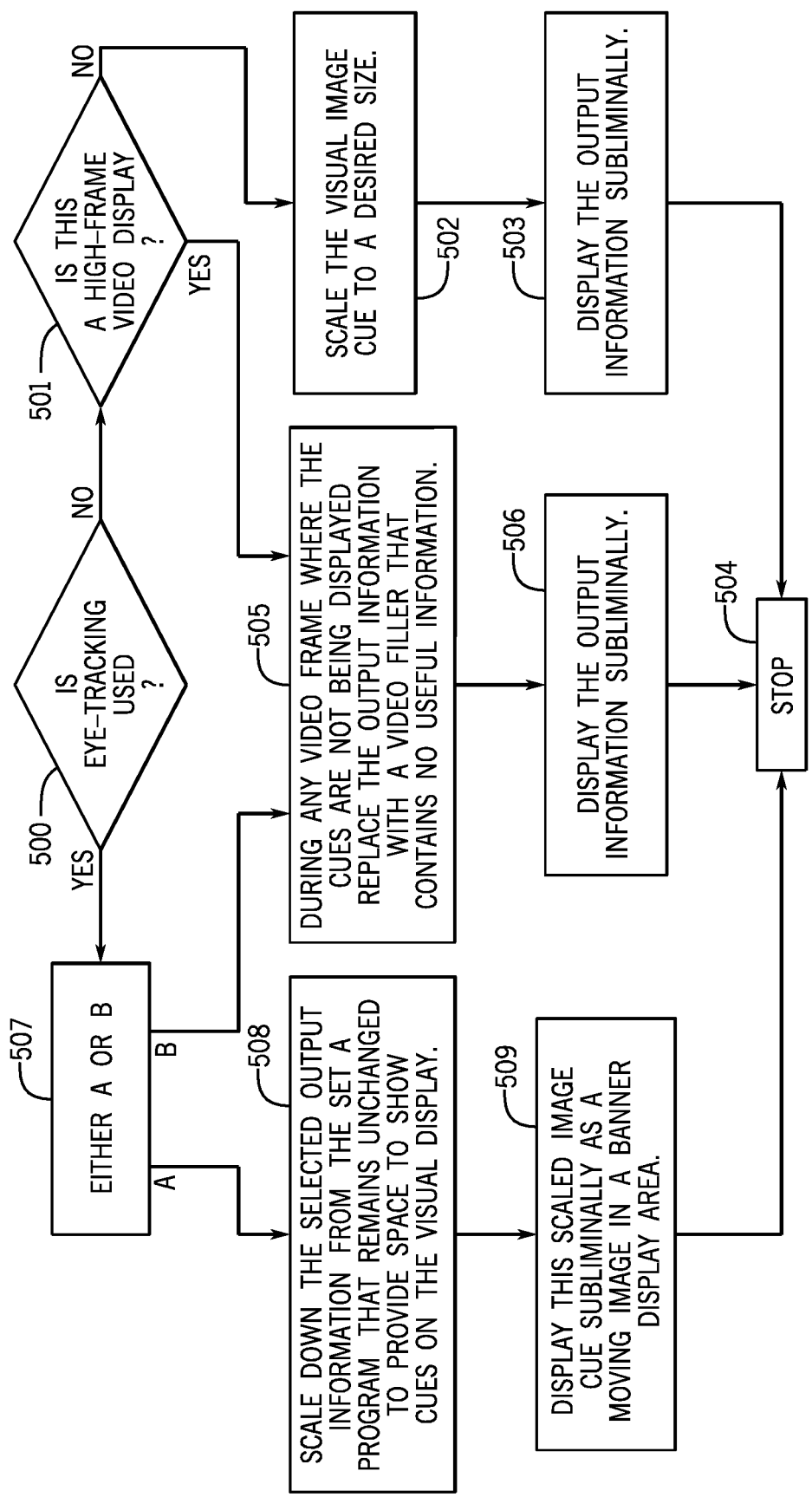
FIG. 5 is a flow chart showing a program sequence for using visual cues to increase the difficulty of answering questions provided by computer game programs or computer learning programs.

Some of the output information is selected to be modified is (Step 400) and a decision is made whether that portion of the output information is to be removed (Step 401). If not, a determination is made whether that output information is made supraliminal (Step 402). If not, a determination is made whether that output information will be made audible, visual, or both (Step 403). If not, and that output information is to be made audible, then text of the replacement output information is created and converted to audible verbal form by methods known in the art (Step 404). If the output information is to be made visual, then the process described in FIG. 5 is implemented (Step 405). A determination is made whether more output informations should be replaced (Step 406). If not, the program sequence is stopped (Step 407). If so, the program sequence is repeated for selecting an output information to be modified (Step 400).

If a determination is made to remove output information (Step 401), replace output information with non-informational output information (Step 408). If a determination is made to make output information supraliminal (Step 402), replace output information with less informative output information or display the output information more briefly (Step 409).

FIG. 5 is a flowchart showing the use of visual cues to increase the difficulty of answering a question provided by a Set A computer game program or a computer learning program. A determination is made whether eye-tracking is used (Step 500). If eye-tracking is not to be used, a determination is made whether a high-frame video display will be used (Step 501). If no, then create a space in the user interface by rasterizing and graphically scaling enough of the output information to make sufficient space (Step 502). Next, display the output information subliminally (Step 503). The program sequence stops (Step 504). If the video display is a high-frame video display, during any video frame where the cues are not being displayed replace the output information with a video filler that contains no useful information (Step 505). Next, display the output information subliminally in its usual position (Step 506). Then the program sequence stops (Step 504). If eye-tracking (Step 500) is used, two procedures may be used (Step 507). Step 507 determines which procedure A or procedure B is to be used. First, create a space in the user interface by rasterizing and graphically scaling enough of the output information to make sufficient space (Step 508). The selected output information from the Set A program that remains unchanged is scaled down to provide space to show cues on the visual display. Next, scale down the replacement output information to be transformed and display this scale image subliminally as a moving image in the banner display area (Step 509). Finally, the program sequence stops (Step 504). Alternatively, proceed with procedure B which starts at Step 505. Note that procedure B consists of the same actions that occur when a high-frame rate display is in use.

Answering a question provided by a computer game program or a computer learning program can be made more difficult by removing some output information, keeping the output information as a supraliminal output but by removing useful information, or by converting the output information to a subliminal form. Textual output information can be converted to audible language by methods well known in the art. A modification of the audible output can be created to provide less output information. Visual presentation of modified output information depends on whether there is sufficient empty space to display transformed output information. The size and location of unmodified user interface elements are adjusted to make space, or the transformed output is subliminally displayed on the entirety of the display, or on just a portion of the display if a high-frame rate device is in use. Mathematical scaling of images is well-understood. Making a relatively easy computer game or learning program somewhat more difficult is expected to accomplish the goal of making the game or program more satisfying, enjoyable, and effective.

The preferred ways of increasing difficulty of answering questions or providing correct responses in computer games and learning programs include 1) removal of some or all less perceptible supraliminal informative information; 2) removal of some perceptible supraliminal information; 3) reduction of utility of perceptible information without totally removing of this type of information; 4) introduction as subliminal information some or all of the supraliminal information that was removed in steps 1 through 3.

When output information is audible some of the ways to increase or decrease perceptibility include changing the intensity, duration, and frequency of the informative sound or applying some other audio transform methods, for example, changing the perceived direction of a sound. When a haptic output device, such as a vibrating game controller for example, is in use then the physical output effects of the haptic device can be used.

The modifications to output information in computer games and learning programs disclosed herein will result in one or more of the following changes: 1) The difficulty level of answering questions or providing correct responses will be changed. 2) The degree of informative help will be changed. 3) It will be possible to simulate effects which are in fact not actually achievable in the real world. For example, in the real world, one cannot be made "luckier" or be made to choose a correct answer or correctly guess a random number. However, if one receives a subliminal cue and thereby achieves an increased response rate, one feels luckier. This is a result that gamers might desire and appreciate. 4) The efficacy of educational programs will be increased. 5) The ability to create "vanity" entertainment programs is facilitated. Often in life people perform activities that increase their self-esteem. These activities are often not entirely rational in nature but people nevertheless perform these activities and benefit in some emotional sense. If subliminal cueing were used to make certain games easier to win without overtly or obviously decreasing their difficulty then this can be expected to feed the self-esteem of the gamer (if the gamer is susceptible to such an emotional response). 6) The ability to insert subliminal cueing at a very low level of granularity and with relatively little interconnection with computational functions other than the textual insertion point is facilitated. This insertion is modular with little or no dependence on function or data that resides elsewhere than in the inserted Set ESP program. There are two possible exceptions to this independence of function. First, it may or may not be necessary to train the user to recognize and respond to the cues in use. Second, it may or may not be necessary to test the user's perspicacity to visual and/or audible cues. This ease of insertion of the Set ESP program into Set A programs is advantageous with respect to the commercialization of easily modifiable Set A computer game and learning programs.

This invention is used to create modifications in existing computer game and learning programs to modify their level of difficulty. These types of programs include educational programs with testing functions that use multiple-choice questions, vanity games, and simulated characteristic games. For example, subliminal cueing added to an educational program may be used to decrease the difficulty level by cueing a user with correct answer hints to a multiple-choice question. A vanity game may be a casual game which has had its difficulty level reduced by subliminal cueing.

A non-exhaustive list of vanity games includes crossword puzzles, maze games, games which are similar to Pacman, games which require the user to solve combination locks. In a crossword puzzle game, the user needs to indicate a certain up or down word before cueing can occur. In a maze game, at each chance to move in a new direction, the cueing can indicate the best direction to proceed. In a game with characteristics similar to Pacman, at each chance to move in a new direction, the cueing would suggest the best direction to proceed. When required to solve a combination lock, the cueing would suggest the correct opening combination. In a map game cueing provides useful information about the map.

A simulated characteristic game simulates a quality or characteristic of a game entity that is not attainable in reality. For example, suppose in a D&D game that in addition to strength, intelligence, and wisdom that a game entity also has good luck. Subliminal cueing may be used to help a user choose the correct inputs, simulating good luck.

Example—Learning Program

A multiple-choice question in the learning program is: "Is Socrates alive?". The two possible answers are "Yes" and "No". Visual cueing occurs on a high-frame rate video display in some unused portion of the screen away from the text of the question and away from the text of the two answers. Some of the frames displayed during each second of display contain the text "No". Alternatively, audio cueing occurs during the time the user has not input an answer. At a low audio level, the word "No" will be output on a speaker associated with the video display. In yet another alternative, both the audio and visual cueing might occur at the same time. At the same time the "No" is flashed on some portion of the screen, the word "No" is played at a low decibel level on a speaker. In yet another alternative, a low-frame rate display is being used, audible cueing is not being displayed, and an eye-tracking device is in use. On some used portion of the video display a moving video banner is created. In those frames of the banner when a cue is not being displayed a non-distracting, uninformative video filler is displayed. When the user is not looking at the moving banner the video cue "No" is displayed in the banner. This cue display may or may not be modified using steganography to alter its appearance. If the user tries to directly look at the banner, then the cue is replaced with the video filler. After the video and/or audio cues have been presented, the user enters the answer input. Because of the cueing the user will have a higher probability of entering a correct input.

Example—Vanity Game

The user is playing a simple Dungeons & Dragons type of game. The user has won a battle and has been rewarded a treasure chest. To get the contents of the treasure chest the user must enter a correct combination of the treasure chest. In the game the user has been presented earlier with some clue as to what the combination is, and the user may have only a limited amount of time to enter the combination or the chest simply disappears, and the reward is lost. The output displayed by the Set ESP program will be the video image of the chest and a place to enter the combination of the lock. The answer is 1234. Visual cueing occurs on a high-frame rate video display in some unused portion of the screen away from the text of the question and away from the text of the two answers. Some of the frames displayed during each second of display contain the text "1234". Alternatively, audio cueing occurs during the time the user has not input an answer. At a low audio level, the words "one, two, three, four" will be output on a speaker associated with the video display. In yet another alternative, both the audio and visual cueing might occur at the same time. At the same time the "1234" is flashed on some portion of the screen, the words "one, two, three, four" are played at a low decibel level on a speaker. In yet another alternative, a low-frame rate display is being used, audible cueing is not being displayed, and an eye-tracking device is in use. On some used portion of the video display a moving video banner is created. In those frames of the banner when a cue is not being displayed a non-distracting, uninformative video filler is displayed. When the user is not looking at the moving banner the video cue "1234" is displayed in the banner. This cue display may or may not be modified using steganography to alter its appearance. If the user tries to directly look at the banner, then the cue is replaced with the video filler. After the video and/or audio cues have been presented, the user enters the answer input. Because of the cueing the user will have a higher probability of entering a correct input.

Figure 6:
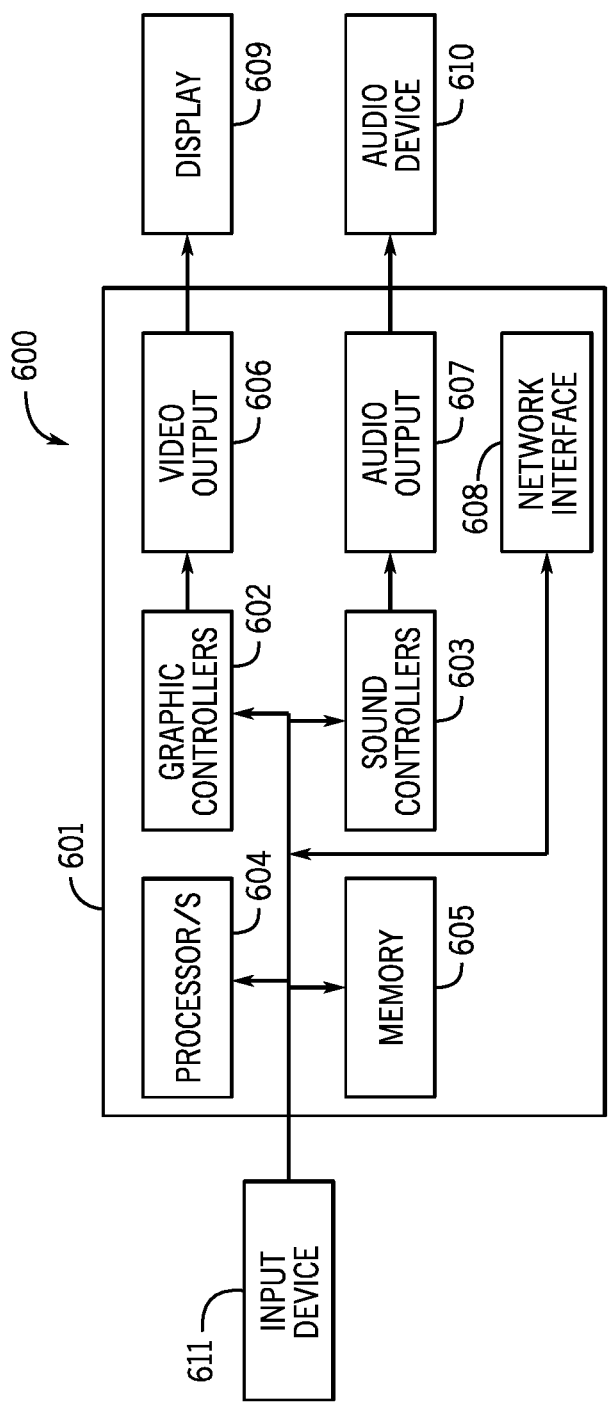
FIG. 6 is a schematic block diagram of a computer-based user device for implementing the method of this invention.
Figure 7:
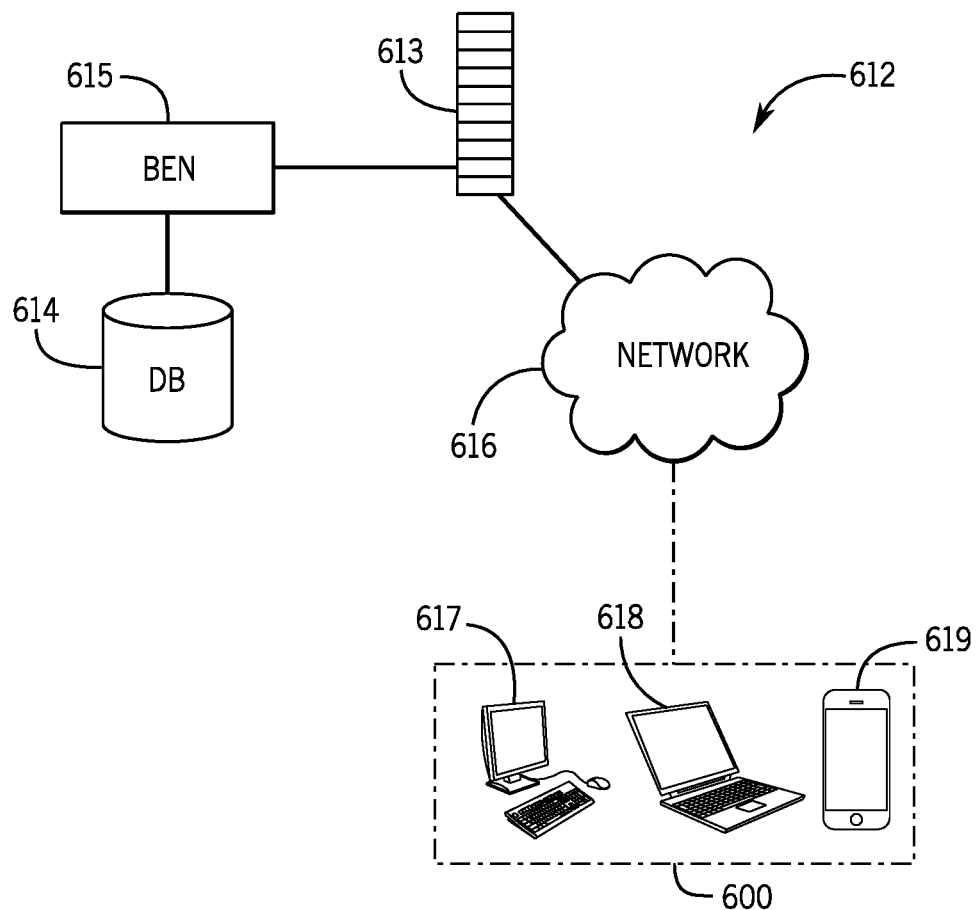
FIG. 7 is a schematic block diagram of a computer-based network system for implementing the method of this invention.

This invention can be implemented in a computer system and network system as shown in FIGS. 6 and 7 as non-transitory computer-readable media which comprise all computer-readable media except for a transitory, propagating signal. FIG. 6 provides a schematic block diagram of a user device 600 for implementing this invention. All of the blocks shown are implemented by suitable circuitry and may be implemented in hardware and/or software. The user device 600 has a computer system 601 having a graphics controller 602 and a sound controller 603. The graphics controller 602 and sound controller 603 are provided by the one or more processors 604 and memory 605. The graphics controller 602 is configured to provide a video output 606. The sound controller 603 is configured to provide an audio output 606. The computer system 601 has a network interface 608 allowing the computer system 601 to be able to communicate with a network such as the Internet or other communication infrastructure. The video output 606 is provided to a display 609. The audio output 607 is provided to an audio device 610 such as a speaker and/or earphones. The user device 600 has an input device 611 which can take any suitable format and can be one or more keyboards, audio input, mouse, touch screen, joystick or game controller. The user device 600 is shown by way of example only. In alternative embodiments, one or more of the parts may be omitted. Alternatively, or additionally, some embodiments may comprise one or more other parts. Alternatively, or additionally, one or more parts may be combined.

FIG. 7 shows block diagram of a network system 612 for implementing this invention comprising a server 613 which may store or be in communication with database 614. A back-end infrastructure (BEN) 615 may be provided between the database 614 and the server 613. The server 613 may have computer games and learning programs data function, comprising one or more units of memory to store the computer game program and a processor 604 to run the games programs and learning programs. The server 613 may communicate via a communications infrastructure 616 to one or more user devices 600, shown as computer 617, tablet 618 and smart phone 619. The communications infrastructure 616 may be the Internet or the like.

A person skilled in the art will realize that the different approaches to implementing computer games and learning programs are not exhaustive and what are described herein are certain preferred embodiments. It is possible to implement the computer games and learning programs in a number of variations without departing from the spirit or scope of the invention.

The foregoing description illustrates and describes the disclosure. Additionally, the disclosure shows and describes only the preferred embodiments but, as mentioned above, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A computer implemented method for decreasing the level of difficulty in a computer game program or computer learning program (Set A program) for a user to perceive a correct answer to a question presented to the user by the Set A program and to induce the user to know the correct answer, comprising:
   1) entering into an input device on a computer by a user a Set A program and a Set ESP program, wherein the Set A program accepts an input of any of a set of strings to be a correct answer and wherein the Set ESP program accepts exactly one string to be a correct answer, wherein the Set A program provides output information on the output device that helps the user to obtain a correct answer to the question;
   2) presenting to the user by the Set A program on an output device of the computer a question for the user to answer;
   3) modifying the output information of the Set A program by the Set ESP program and presenting to the user by the Set ESP program on an output device of the computer the modified output information and/or a cue, wherein the modified output information and the cue decrease the level of difficulty for the user to perceive a correct answer to the question and induce a user to know the correct answer;
   4) reading and/or hearing the question and the modified output information and/or the cue on the output device of the computer, by the user;
   5) determining an answer to the question by the user after hearing or reading the modified output information and/or the cue;
   6) entering an answer to the question by the user into the Set ESP program using an input device of the computer; and
   7) determining in the Set ESP program whether the answer satisfies a guard requirement, wherein if the answer satisfies the guard requirement the Set ESP program executes a guarded subfunction if the entered answer is correct and displays on the output device of the computer whether the user's answer is correct or incorrect, and wherein if the answer does not satisfy the guard requirement the Set ESP program stops the Set ESP program sequence.

2. The computer implemented method of claim 1, wherein the modified output information is audio or visual or a combination thereof.

3. The computer implemented method of claim 1, wherein the cue is audio, visual, or haptic or a combination thereof.

4. The computer implemented method of claim 1, wherein the cue is presented repeatedly on the output device until the user enters a response into the input device.

5. The computer implemented method of claim 3, further comprising displaying the audio, visual, and haptic cues on the output device subliminally so that the user is not aware of the cues.

6. The computer implemented method of claim 5, further comprising displaying the visual cue on the output device for a limited amount of time and at random locations on the output device.

7. The computer implemented method of claim 5, further comprising displaying the visual cue on the output device at a location at which the user is not looking using eye-tracking software and/or hardware to enable the Set ESP program to detect where the user is looking.

8. The computer implemented method of claim 7, further comprising displaying the visual cue as a moving image in a banner display.

9. A computer implemented method for decreasing the level of difficulty in a computer game program or computer learning program (Set A program) for a user to perceive a correct answer to a question presented to the user by the Set A program and to induce the user to know the correct answer, comprising:
   1) entering into an input device on a computer by a user a Set A program and a Set ESP program, wherein the Set A program accepts an input of any of a set of strings to be a correct answer and wherein the Set ESP program accepts exactly one string to be a correct answer, wherein the Set A program provides output information on the output device that helps the user to obtain a correct answer to the question;
   2) presenting to the user by the Set A program on an output device of the computer a question for the user to answer;
   3) modifying the output information of the Set A program by the Set ESP program and presenting to the user by the Set ESP program on an output device of the computer the modified output information and/or a cue, wherein the modified output information and the cue decrease the level of difficulty for the user to perceive a correct answer to the question and induce a user to know the correct answer, wherein the modified output information is audio or visual or combination thereof, wherein the cue is audio, visual, or haptic or a combination thereof, and wherein the cue is presented repeatedly on the output device until the user enters a response into the input device;
   4) reading and/or hearing the question and the modified output information and/or the cue on the output device of the computer, by the user;
   5) determining an answer to the question by the user using the modified output information and/or the cue;
   6) entering an answer to the question by the user into the Set ESP program using an input device of the computer; and
   7) determining in the Set ESP program whether the answer satisfies a guard requirement, wherein if the answer satisfies the guard requirement the Set ESP program executes a guarded subfunction if the entered answer is correct and displays on the output device of the computer whether the user's answer is correct or incorrect, and wherein if the answer does not satisfy the guard requirement the Set ESP program stops the Set ESP program sequence.

10. The computer implemented method of claim 9, further comprising displaying the audio, visual, and haptic cues on the output device subliminally so that the user is not aware of the cues.

11. The computer implemented method of claim 10, further comprising displaying the visual cue on the output device for a limited amount of time and at random locations on the output device.

12. The computer implemented method of claim 10, further comprising displaying the visual cue on the output device at a location at which the user is not looking.

13. The computer implemented method of claim 12, further comprising displaying the visual cue as a moving image in a banner display.

14. A computer implemented method for decreasing the level of difficulty in a computer game program or computer learning program (Set A program) for a user to perceive a correct answer to a question presented to the user by the Set A program and to induce the user to know the correct answer, comprising:
 1) entering into an input device on a computer by a user a Set A program and a Set ESP program, wherein the Set A program accepts an input of any of a set of strings to be a correct answer and wherein the Set ESP program accepts exactly one string to be a correct answer, wherein the Set A program to provides output information on the output device that helps the user to obtain a correct answer to the question;
 2) presenting to the user by the Set A program on an output device of the computer a question for the user to answer;
 3) modifying the output information of the Set A program by the Set ESP program and presenting to the user by the Set ESP program on an output device of the computer the modified output information and/or a cue, wherein the modified output information and the cue decrease the level of difficulty for the user to perceive a correct answer to the question and induce a user to know the correct answer, wherein the modified output information is audio or visual or combination thereof, wherein the cue is audio, visual, or haptic or a combination thereof, and wherein the cue is presented repeatedly on the output device until the user enters a response into the input device;
 4) displaying the audio, visual, or haptic cues on the output device subliminally so that the user is not aware of the cue;
 5) displaying the visual cue on the output device for a limited amount of time and at random locations on the output device;
 6) displaying the visual cue on the output device at a location at which the user is not looking;
 7) reading and/or hearing by the user the question and the modified output information and/or the cue on the output device of the computer, by the user;
 8) determining an answer to the question by the user using the modified output information and/or the cue;
 9) entering an answer to the question by the user into the Set ESP program using an input device of the computer; and
 10) determining in the Set ESP program whether the answer satisfies a guard requirement, wherein if the answer satisfies the guard requirement the Set ESP program executes a guarded subfunction if the entered answer is correct and displays on the output device of the computer whether the user's answer is correct or incorrect, and wherein if the answer does not satisfy the guard requirement the Set ESP program stops the Set ESP program sequence.

15. The computer implemented method of claim 14, wherein the visual cue is displayed as a moving image in a banner display.

16. The computer implemented method of claim 14, wherein displaying the visual cue on the output device at a location at which the user is not looking is accomplished with eye-tracking software and/or hardware which enables the Set ESP program to detect at what part of the display the user is looking.

* * * * *